(12) United States Patent
Horng

(10) Patent No.: US 6,435,722 B1
(45) Date of Patent: Aug. 20, 2002

(54) COMBINATION STRUCTURE FOR OIL-IMPREGNATED BEARING

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 45 days.

(21) Appl. No.: 09/769,348

(22) Filed: Jan. 26, 2001

(51) Int. Cl.⁷ ................................................ F16C 33/10
(52) U.S. Cl. ...................................... 384/279; 384/135
(58) Field of Search ................................ 384/279, 130, 384/135, 903, 100, 107, 111, 113–115, 118, 119, 226–228, 243, 244, 246, 276, 295, 322, 397, 415, 428, 902; 310/90

(56) References Cited

U.S. PATENT DOCUMENTS

| | | | | |
|---|---|---|---|---|
| 4,711,590 A | * | 12/1987 | Lakin | .......................... 384/135 |
| 5,281,035 A | * | 1/1994 | Lo | .............................. 384/135 |
| 5,610,462 A | | 3/1997 | Takahashi | ..................... 310/90 |
| 6,336,745 B1 | * | 1/2001 | Horng et al. | ................ 384/107 |

* cited by examiner

Primary Examiner—Thomas R. Hannon
(74) Attorney, Agent, or Firm—Bacon & Thomas, PLLC

(57) ABSTRACT

An oil-impregnated bearing combination includes an axle tube whose upper end has an upper cap having an opening is secured in a tight fit manner inside the axle tube hole. After a rotor shaft extends through the opening of the upper cap, a retainer is snapped on the shaft. The retainer is provided with an annular wall protruding outward from the opening of the upper cap and rested on a shaft seat. The outer peripheral of the shaft under the retainer is sleeved with an oil-impregnated bearing, and the oil-impregnated bearing is placed in the inner hole of the axle tube in a non-tight fit manner. The lower end of the axle tube is sealed by a lower cap, so that the oil-impregnated bearing is retained between the upper cap and the lower cap, for supporting rotation of the rotor shaft.

12 Claims, 4 Drawing Sheets

COMBINATION STRUCTURE FOR OIL-IMPREGNATED BEARING

BACKGROUND OF THE INVENTION

1. Field of the Invention

The present invention relates to an improved combination structure of an oil-impregnated bearing and a rotor shaft, especially, an oil-impregnated bearing is positioned in an axle tube in a non-tight fit manner, thereby allowing pivotal connection of the rotor shaft, and a retained is used to prevent the lubricating oil in the axle tube from leaking, and meanwhile, prevent the shaft of the rotor from detaching from the axle tube.

2. Description of the Related Prior Art

A conventional heat-dissipating fan or brushless motor includes a rotor having a shaft pivotally held by a bearing. Commonly used bearings include ball bearings or oil-impregnated bearings (self-lubricating bearings). An oil-impregnated bearing is generally tightly secured to the inner periphery of an axle tube or bearing seat for pivotally holding the rotor shaft. It is, however, found that the oil-impregnated bearing is compressed in the radial direction and thus results in deformation in the inner periphery of a center hole in the oil-impregnated bearing. As a result, non-smooth friction occurs between the rotor shaft and the inner periphery of the hole in the oil-impregnated bearing. Although such a deformation is relatively small, rotational noise tends to occur under continuous operation of the rotor shaft at a high speed. In addition, a gap between the rotor shaft and the inner periphery of the hole in the oil-impregnated bearing becomes larger due to the continuous non-smooth friction. Vibrations occur during rotation of the rotor shaft and greater noise is thus generated. The operating life of the bearing is accordingly shortened.

The U.S. Pat. No. 5,610,462 to Takahashi, filed on Jun. 20, 1994, disclosed a brushless motor in which an oil-impregnated sleeve bearing is inserted in a bearing holder having a cylindrical shape with a closed bottom, and a rotating shaft is inserted in the oil-impregnated sleeve bearing in such a manner that the rotating shaft may freely rotate. Nevertheless, some of the elements are difficult to manufacture, such as the boss 58 and the cut-away portions 46d1 of the rotor, as the boss 58 and the cut-away portions 46d1 must mate with each other precisely in order to prevent oil leakage and to provide an easy assembly procedure.

The U.S. patent application Ser. No. 09/563,955, U.S. Pat. No. 6,336,745 filed on May 2, 2000, entitled by "Oil-impregnated Bearing and Rotor Shaft Combination", discloses an oil-impregnated bearing combination. The inner peripheral of the upper end of the axle tube 1 is tightly fitted with an upper cap 12 having an opening 121. After the rotor shaft 3 passes through the opening 121 of the upper cap 12, a retainer 32 such as a retainer ring is snapped in a retaining groove 31 defined in the rotor shaft 3, so that the rotor shaft 3 is limited and cannot be detached. The outer peripheral of the rotor shaft 3 under the retainer 32 is fitted in an oil-impregnated bearing 2, and the oil-impregnated bearing 2 is placed in the inner hole of the axle tube 1 in a non-tight fit manner. The lower end of the axle tube 1 is then sealed by a lower cap 13, so that the oil-impregnated bearing 2 is retained between the upper cap 12 and the lower cap 13 for supporting the rotor shaft 3 to rotate.

However, the retainer 32 has a ring shape, and is snapped on the rotor shaft 3, therefore, the rotor shaft 3 needs to form a retaining groove 31 for positioning the retainer 32, thereby causing inconvenience in machining and assembling due to the ring-shaped retainer 32. In addition, the ring-shaped retainer 32 cannot efficiently prevent oil leakage.

SUMMARY OF THE INVENTION

The objective of the present invention is to provide a combination of an oil-impregnated bearing and a rotor, which can optimally prevent the lubricating oil from leaking, and the parts are easily assembled and machined.

The second objective of the present invention is to provide an oil-impregnated bearing combination, wherein the oil-impregnated bearing is placed in the axle tube in a non-tight fit manner, so that the inner peripheral of the central hole of the oil-impregnated bearing will not be deformed, therefore, the rotor shaft can be rotated smoothly, and thereby reducing noise of rotation.

The third objective of the present invention is to provide an oil-impregnated bearing combination which may prevent the lubricating oil from leaking, and prevent dust, impurities from entering the axle tube through the shaft seat, thereby prolonging the lifetime of the bearing.

According to the present invention, the axle tube whose upper end has an upper cap having an opening is secured in a tight fit manner inside the axle tube hole. After a rotor shaft extends through the opening of the upper cap, a retainer is snapped on the shaft. The retainer is provided with an annular wall protruding outward from the opening of the upper cap and rested on a shaft seat. The outer peripheral of the shaft under the retainer is sleeved with an oil-impregnated bearing, and the oil-impregnated bearing is placed in the inner hole of the axle tube in a non-tight fit manner. The lower end of the axle tube is sealed by a lower cap, so that the oil-impregnated bearing is retained between the upper cap and the lower cap, for supporting rotation of the rotor shaft.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Figure 1:
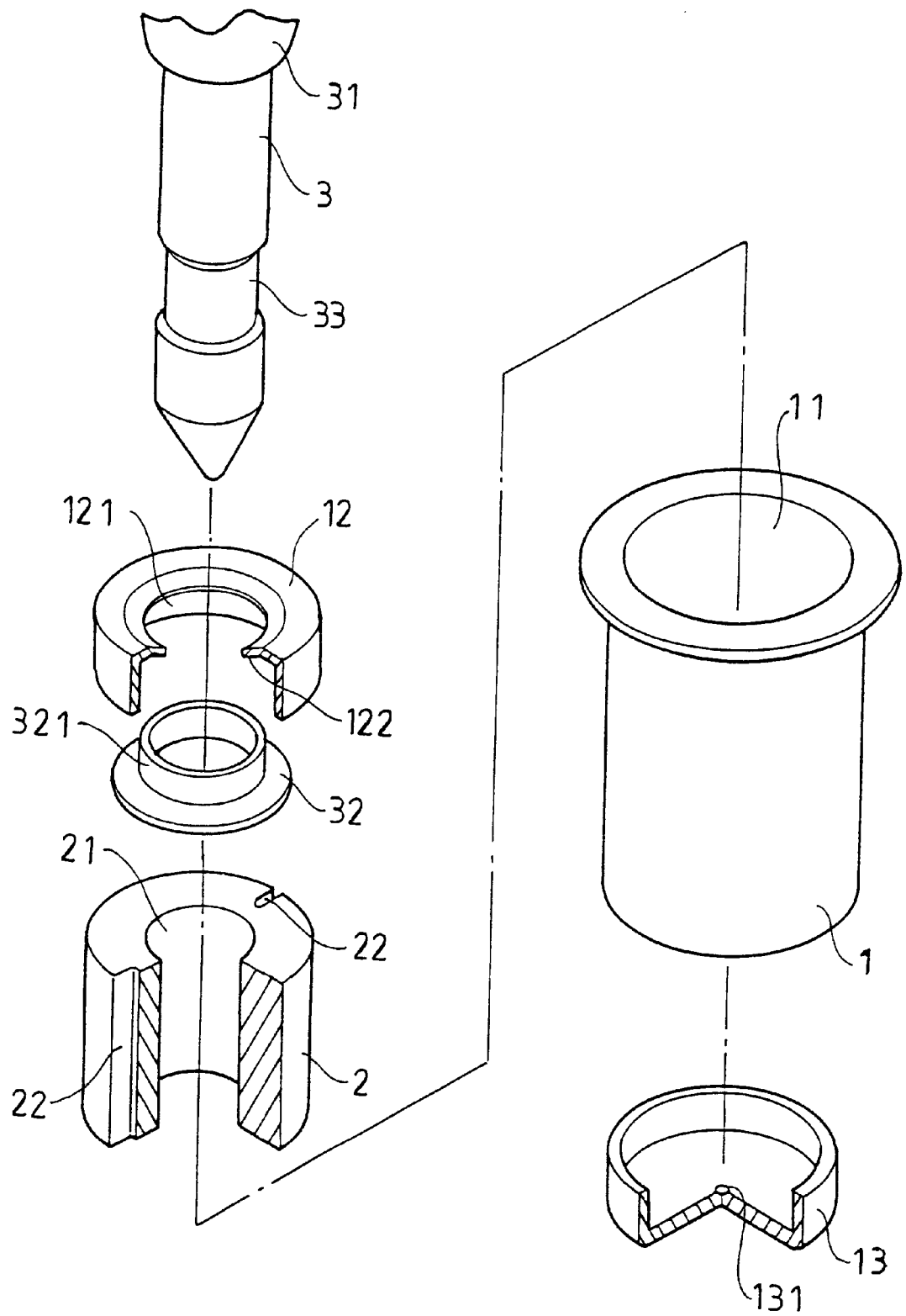
FIG. 1 is an exploded perspective view of a first embodiment of an oil-impregnated bearing combination in accordance with the present invention.

Preferred embodiments in accordance with the present invention will now be described with reference to the accompanying drawings. Referring to FIG. 1, an oil-impregnated bearing combination in accordance with a first embodiment of the present invention generally comprises an axle tube 1, an oil-impregnated bearing 2, and a rotor shaft 3.

The axle tube 1 may be made of metallic material, or directly formed by a bearing seat of a housing. The axle tube 1 defines a hollow inner hole 11, and the inner hole 11 is provided so that the oil-impregnated bearing 2 is placed in the inner hole 11 in a non-tight fit manner. After the oil-impregnated bearing 2 is placed in the inner hole 11, the upper end of the axle tube 1 is tightly mounted and sealed with an upper cap 12 having an opening 121. The opening 121 of the upper cap 12 allows passage of the rotor shaft 3. In addition, in the preferred embodiment, the periphery of the opening 121 of the upper cap 12 is formed with an oblique wall face 122 inclined downward. Therefore, the oblique wall face 122 has an effect for stopping the lubricating oil. The lower end of the axle tube 1 is sealed by the lower cap 13 in a tight fit manner, whereby the oil-impregnated bearing 2 is retained in the inner hole 11 of the axle tube 1 between the upper cap 12 and the lower cap 13, and the inner end face of the lower cap 13 can be used for supporting the rotor shaft 3. The lower cap 13 is formed with an arcuate depression 131 at the position for supporting the rotor shaft 3 so that the rotor shaft 3 can be more stably supported to rotate.

The oil-impregnated bearing 2 may be a conventional copper bearing, self-lubricating bearing, or a bearing containing lubricating oil fluid therein. The oil-impregnated bearing 2 is placed in the inner hole 11 of the axle tube 1, and has a central hole 21 for supporting rotation of the rotor shaft 3. The outer surface of the oil-impregnated bearing 2 is provided with at least one longitudinal channel 22 extended through the upper and lower end faces of the oil-impregnated bearing 2, and the longitudinal channel 22 is used for facilitating the lubricating oil in the axle tube 1 circulating between the upper and lower ends of the oil-impregnated bearing 2.

The shaft 3 has one end combined to a shaft seat 31 at the center of a rotor, the other end passing through the opening 121 of the upper cap 12 and the central hole 21 of the oil-impregnated bearing 2, and a distal end rested on the inner end face of the lower cap 13. The shaft 3 is snapped by a retainer 32 after passing through the opening 121 of the upper cap 12. In the preferred embodiment, the retainer 32 may be made of plastic material, and has an annular wall 321 which is tightly fitted on the shaft 3, and, the annular wall 321 protrudes outward from the opening 121 of the upper cap 12, and is rested on the shaft seat 31, thereby preventing dust, impurity from entering the axle tube 1 through the shaft seat 31. In addition, the inner diameter of the opening 121 of the upper cap 12 is smaller than the maximum outer diameter of the retainer 32, and it is proper that a smallest clearance is defined between the opening 121 of the upper cap 12 and the annular wall 321, thereby preventing loss of the lubricating oil in the axle tube 1. For reducing the contact area between the shaft 3 and the oil-impregnated bearing 2, the shaft 3 defines at least one annular groove 33, and the annular groove 33 can be further used for storing and accumulating the lubricating oil. The distal end of the shaft 3 may be formed with a conical shape, and the conical shaft 3 can be rested in the arcuate depression 131 of the lower cap 13 so that the rotor shaft 3 can be rigidly supported by the lower cap 13 to rotate stably.

Figure 2:
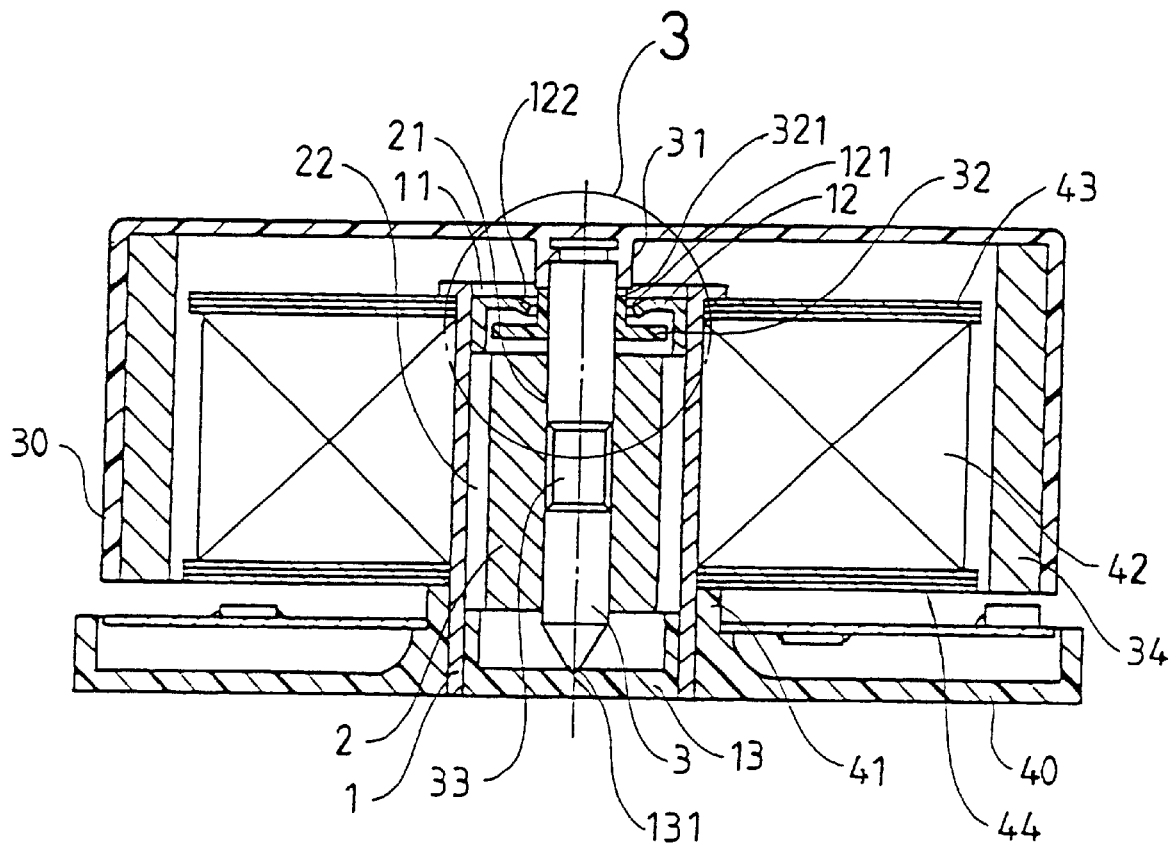
FIG. 2 is a sectional view of the oil-impregnated bearing combination as shown in FIG. 1.
Figure 3:
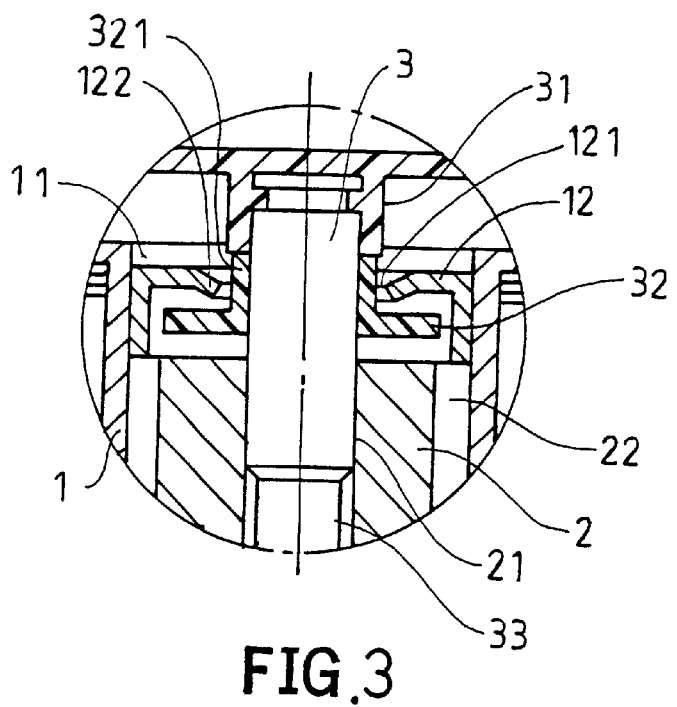
FIG. 3 is an enlarged view of the oil-impregnated bearing combination as shown in FIG. 2.

Referring to FIGS. 2 and 3, according to a first assembly embodiment in use, the axle tube 1 is fixed in the bearing seat 41 of a housing 40 while the outer diameter of the axle tube 1 is sleeved with a stator coil 42, upper and lower pole plates 43 and 44. One end of the shaft 3 is combined to the shaft seat 31 of the center of the rotor 30. The ring magnet 34 induces with the stator coil 42 so that the rotor 30 can be actuated to rotate. The other end of the shaft 3 extends through the opening 121 of the upper cap 12 which is tightly mounted in the axle tube 1, and is snapped by the retainer 32, and the inner diameter of the opening 121 of the upper cap 12 is smaller than the maximum outer diameter of the retainer 32, so that the rotor 30 having the shaft 3 will not detach from the axle tube 1, and the retainer 32 can be used to prevent the lubricating oil in the axle tube 1 from leaking out from the opening 121. Subsequently, the oil-impregnated bearing 2 is placed into the inner hole 11 of the axle tube 1 in a non-tight fit manner from the other end of the axle tube 1, and the central hole 21 of the oil-impregnated bearing 2 is passed by the rotor shaft 3 of the rotor 30, and the lower cap 13 is pressed into the bottom end face of the inner hole 11 of the axle tube 1 in a tight fit manner, and at the same time of the lower cap 13 being combined to the axle tube 1, the lower cap 13 pushes the rotor shaft 3 of the rotor 30 upward, so that the shaft seat 31 of the rotor 30 will not touch the upper cap 12, so that the rotor 30 can be rotated smoothly and stably.

Figure 4:
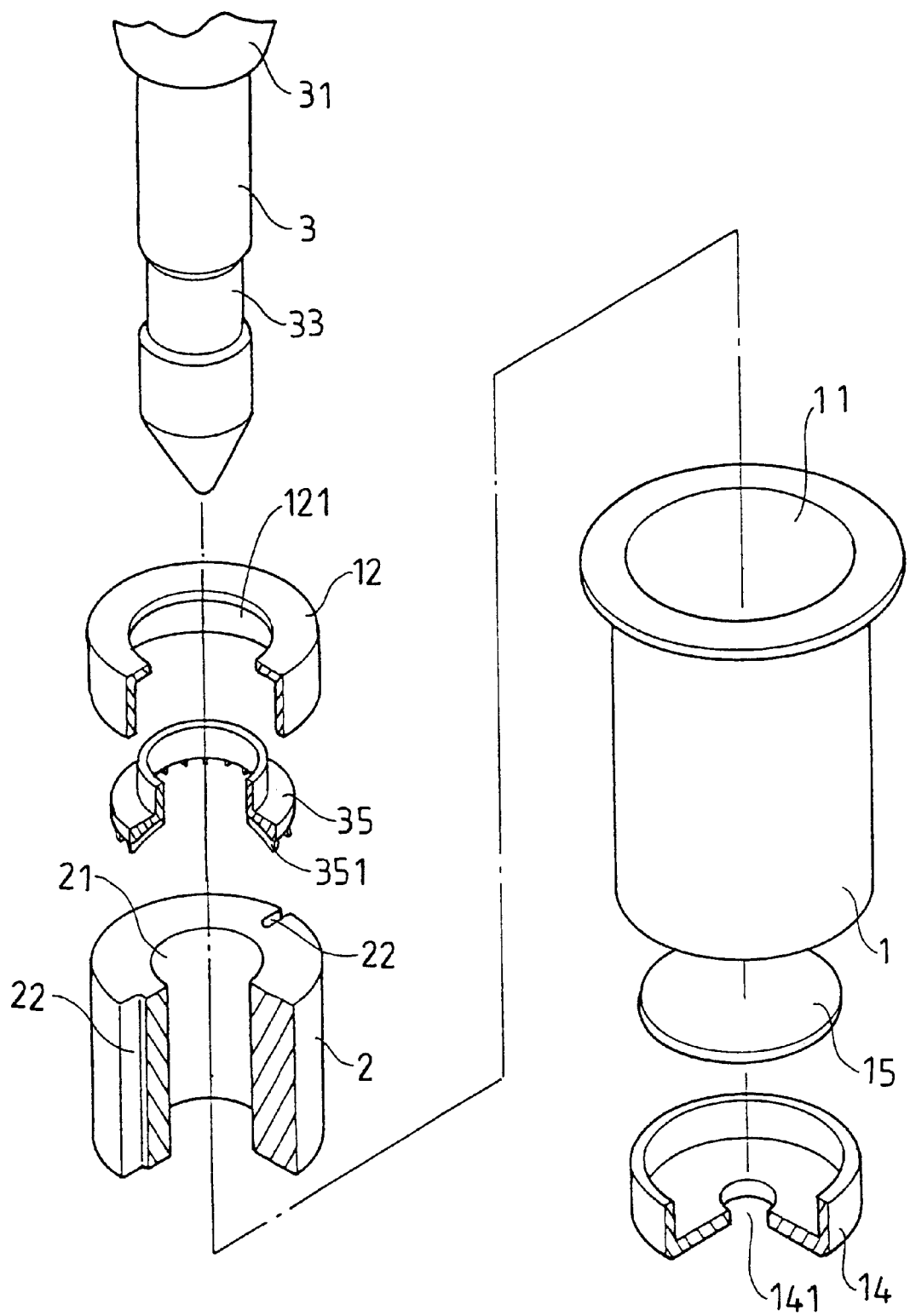
FIG. 4 is an exploded perspective view of a second embodiment of an oil-impregnated bearing combination in accordance with the present invention.
Figure 5:
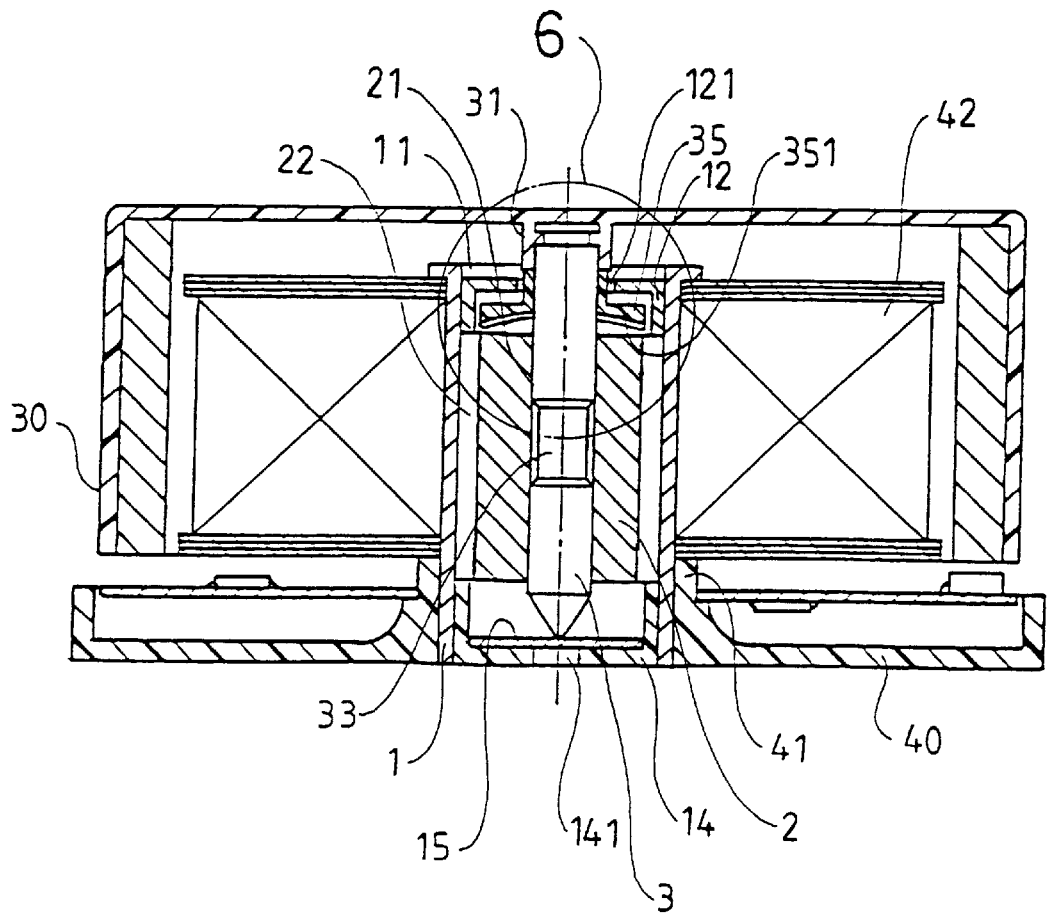
FIG. 5 is a sectional view of the oil-impregnated bearing combination as shown in FIG. 4.
Figure 6:
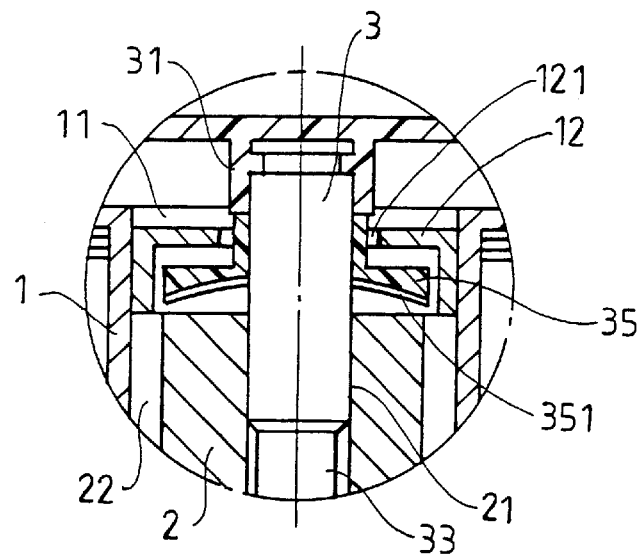
FIG. 6 is an enlarged view of the oil-impregnated bearing combination as shown in FIG. 5.

Referring now to FIGS. 4–6, in accordance with a second embodiment of the present invention, the lower cap 14 has a center defining a through hole 141 or a hole of a larger recess which is covered by a pad 15, the pad 15 may be an abrasion resistant metallic sheet. Therefore, when the pad 15 is rested by the rotor shaft 3 of the rotor 30, the pad 15 may have a resilience that can be deformed slightly, whereby the rotor shaft 3 of the rotor 30 may also obtain an elastic support to rotate stably, and thereby reducing the friction between the lower cap 14 and the shaft 3 so as to increase the lifetime. In addition, the retainer 35 has a bottom forming an oblique wall face extending toward a center thereof. Therefore, the oblique wall face has an effect for guiding the lubricating oil. Meanwhile, the oblique wall face is provided with a plurality of guide slots 351 which are arranged in a radiating manner about a center of a bottom of the upper cap 12, whereby the guide slots 351 will have a better flow guiding effect, thereby guiding the lubricating oil to flow back.

Accordingly, the oil-impregnated bearing is placed in the inner hole of the axle tube in a non-tight fit manner, and is retained in place by the upper cap and the lower cap, therefore, the inner peripheral of the central hole of the oil-impregnated bearing will not be deformed, so that the rotor shaft of the rotor smoothly contacts with the inner wall of the central hole of the oil-impregnated bearing, thereby reducing the noise during rotation of the rotor. In addition, the two ends of the axle tube are sealed by the upper and lower caps, and the shaft closely rested on the lower portion of the opening of the upper cap is tightly fitted with a retainer. The retainer has an annular wall protruding from the opening of the upper cap and is rested on the shaft seat, thereby preventing dust, impurities from entering the axle tube through the shaft seat, and the inner diameter of the opening of the upper cap is smaller than the maximum outer diameter of the retainer, therefore the retainer securing the shaft will prevent the shaft from detaching from the axle tube, and the lubricating oil in the axle tube can be efficiently blocked by the retainer, and will not leak out from the opening of the upper cap. Further, the lubricating oil can be efficiently guided by the retainer to flow back, whereby, the oil-impregnated bearing of the present invention can store the lubricating oil for a long period of time, and can store the lubricating oil between the upper and lower caps and the bearing or accumulated in the annular groove of the shaft, thereby prolonging the lifetime of the bearing.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. An oil-impregnated bearing combination comprising:

an axle tube, defining an inner hole having two ends each respectively secured by an upper cap and a lower cap in a tight fit manner, the upper cap having an opening defined therethrough;

an oil-impregnated bearing, having a central hole placed in the inner hole of the axle tube in a non-tight fit manner, and retained in the inner hole of the axle tube by the upper cap and the lower cap;

a shaft, having a first end combined to a shaft seat of a center of a rotor and a second end passing through the opening of the upper cap in the axle tube, and passing through the central hole of the oil-impregnated bearing, and the distal end of the shaft rested on the lower cap, the shaft section between the upper cap and the oil-impregnated bearing being fitted with a retainer in a tight fit manner, the retainer having an annular wall protruding outward from the opening of the upper cap.

2. The oil-impregnated bearing combination as claimed in claim 1, wherein the opening of the upper cap has a periphery forming an oblique wall face inclined downward.

3. The oil-impregnated bearing combination as claimed in claim 1, wherein the retainer has a bottom forming an oblique wall face extending toward a center thereof.

4. The oil-impregnated bearing combination as claimed in claim 3, wherein the bottom of the retainer defines a plurality of guide slots, the guide slots are arranged in a radiating manner about a center of a bottom of the upper cap.

5. The oil-impregnated bearing combination as claimed in claim 1, wherein the opening of the upper cap has an inner diameter smaller than a maximum outer diameter of the retainer.

6. The oil-impregnated bearing combination as claimed in claim 1, wherein the retainer is made of plastic material.

7. The oil-impregnated bearing combination as claimed in claim 1, wherein the annular wall of the retainer protrudes outward from the opening of the upper cap, and is rested on the shaft seat.

8. The oil-impregnated bearing combination as claimed in claim 1, wherein the oil-impregnated bearing has an outer surface defining at least one longitudinal channel.

9. The oil-impregnated bearing combination as claimed in claim 1, wherein the lower cap is covered by a pad for supporting the second end of the shaft.

10. The oil-impregnated bearing combination as claimed in claim 1, wherein the lower cap has an inner end face defining an arcuate depression, and the second end of the shaft is formed with a conical shape rested in the arcuate depression.

11. The oil-impregnated bearing combination as claimed in claim 1, wherein the shaft defines at least one annular groove provided in the oil-impregnated bearing.

12. The oil-impregnated bearing combination as claimed in claim 1, wherein the lower cap has a center defining a through hole, the through hole is covered by a pad.

* * * * *